United States Patent [19]

Arvin et al.

[11] 3,977,186
[45] Aug. 31, 1976

[54] IMPINGING AIR JET COMBUSTION APPARATUS

[75] Inventors: John R. Arvin; Albert J. Verdouw, both of Indianapolis, Ind.

[73] Assignee: General Motors Corporation, Detroit, Mich.

[22] Filed: July 24, 1975

[21] Appl. No.: 598,674

[52] U.S. Cl. .......................... 60/39.65; 60/39.74 R; 431/352
[51] Int. Cl.² ..................... F02G 3/00; F23D 15/02
[58] Field of Search .................. 60/39.74 R, 39.65; 431/351, 352

[56] References Cited
UNITED STATES PATENTS

| | | | |
|---|---|---|---|
| 2,531,810 | 11/1950 | Fyffe | 60/39.65 |
| 2,930,191 | 3/1960 | Schirmer et al. | 60/39.74 R |
| 2,999,359 | 9/1961 | Murray | 60/39.74 R |
| 3,633,361 | 1/1972 | Bauger et al. | 60/39.72 R |

Primary Examiner—Carlton R. Croyle
Assistant Examiner—Thomas I. Ross
Attorney, Agent, or Firm—Paul Fitzpatrick

[57] ABSTRACT

A combustion liner for a gas turbine combustion apparatus or the like has a head wall and a side wall extending downstream to an outlet for combustion products. A reaction zone is contained within the upstream end of the side wall and a dilution zone downstream. A barrier ring extends inwardly from the side wall to provide a constricted path between the zones. Combustion air is admitted from a cluster of nozzles in the head wall and a ring of nozzles extending forwardly from the side wall. Each nozzle in the head wall is axially aligned with one of the nozzles in the side wall so that air jets entering into the combustion zone through each such pair of nozzles impinge to create a high degree of turbulence. Fuel is jetted against a spatter plate in each nozzle in the head wall so that the fuel is atomized and entrained by the air flowing through the head wall air nozzle.

5 Claims, 3 Drawing Figures

IMPINGING AIR JET COMBUSTION APPARATUS

Our invention relates to combustion apparatus such as is used in gas turbines and particularly to an improved combustion liner or flame tube for such combustion apparatus.

Our invention is directed to a combustion liner which relies upon setting up a very high degree of turbulence in the reaction zone by the impingement of opposed streams of air entering the zone. Such impingement and the resulting turbulence causes a high degree of mixing of fuel and air and complete combustion for minimization of undesired products of combustion.

In the preferred embodiment, air is admitted to the liner through pairs of jets or nozzles coaxially aligned so that the stream from each nozzle of each pair is in direct impingement with the air stream from the other nozzle of the pair. Fuel is atomized and entrained in the air entering through one nozzle of each pair, preferably by an arrangement by which the fuel is jetted onto a plate in the air stream from which it is spattered in droplets so as to be picked up by the air entering through the nozzle.

By the nature of the apparatus, it is particularly suited to heavy fuels which are difficult to atomize or vaporize.

The principal objects of our invention are to provide an improved combustion apparatus for use in gas turbines and similar environments, to provide a combustion apparatus with good emission characteristics, a combustion apparatus which generates a high degree of turbulence and mixing in the combustion zone, and a combustion apparatus in which turbulence is promoted by the impingement of oppositely directed streams of air entering the combustion liner. A further object is to improve the atomization of fuel entering such a combustion apparatus.

The nature of our invention and its advantages will be clear to those skilled in the art from the succeeding detailed description of the preferred embodiment of the invention, the accompanying drawings thereof, and the appended claims.

Before proceeding to a description of the preferred embodiment of the invention it may be in order to point out that there are some disclosures of combustion liners in which combustion air is directed into the liner in such a way as to set up a considerable degree of turbulence and, in some cases, some of the combustion air is directed more or less upstream of the liner. Those examples which seem to us most pertinent to the present subject matter are U.S. Pat. Nos. 3,306,333, Feb. 28, 1967 and 3,650,106, Mar. 21, 1972 to Mock and Guillot.

Figure 1:
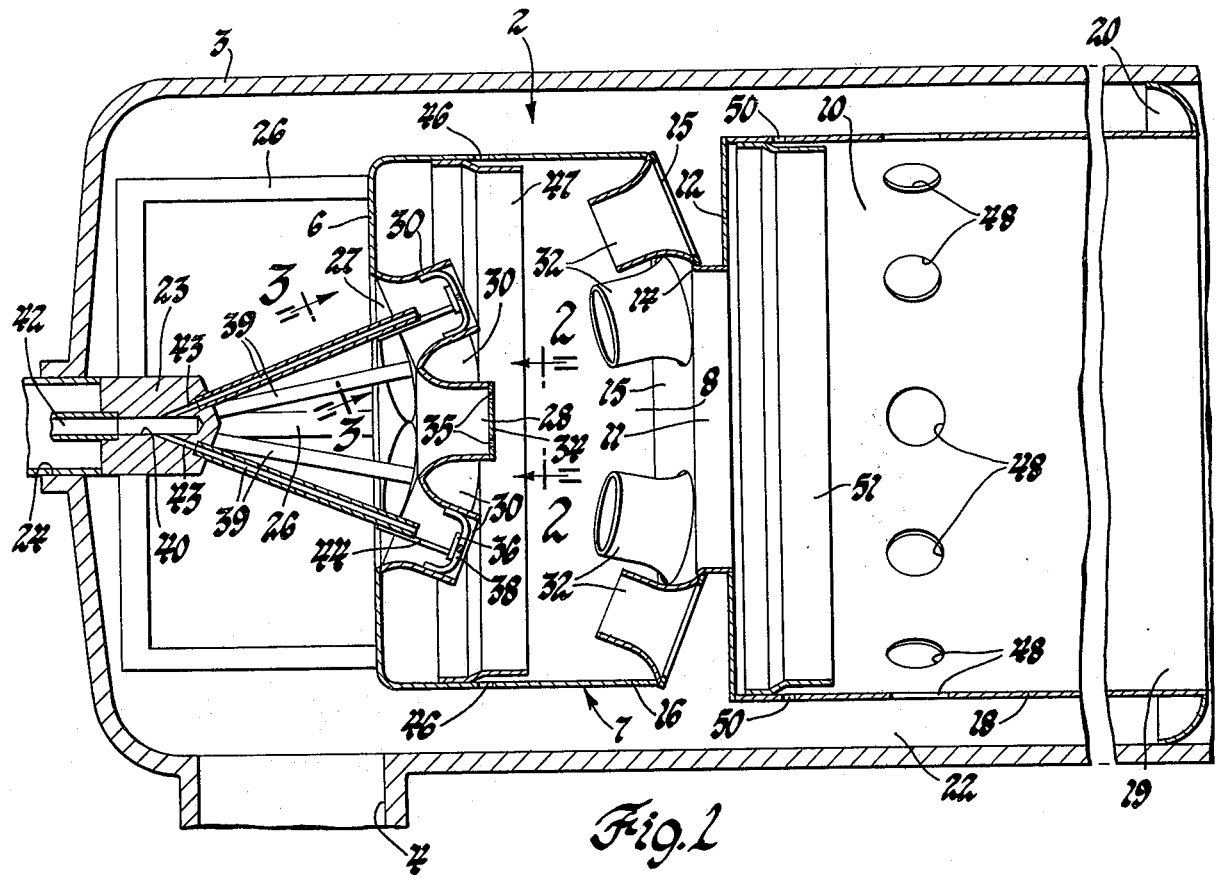
FIG. 1 is a longitudinal sectional view of a combustion apparatus.

Referring to FIG. 1, the combustion liner or flame tube 2 embodying the invention is suitably supported in an outer casing 3 which may be part of a gas turbine engine. Air is supplied to the outer casing from a compressor or the sort through an air inlet indicated more or less schematically at 4. Air under pressure contained within the casing 3 flows through suitable openings in the liner, fuel is mixed with it and burned, and the resulting combustion products are discharged, ordinarily to a turbine. The combustion liner 2 includes a head wall 6 and a generally cylindrical side wall 7 of circular cross section in the particular example. The head wall defines the upstream end of the flame tube and the side wall defines a reaction zone 8 immediately downstream of the head wall and a dilution zone 10 farther downstream.

Air, after being reacted with fuel in the combustion zone 8, flows through a constricted passage 11 defined by a barrier ring 12 extending inwardly from the side wall 7 at the upstream end of the dilution zone. Barrier ring 12 includes a forwardly extending flange 14 which is connected to a frustoconical ring 15 the inner margin of which is welded or brazed to flange 14 and the outer margin of which is welded or brazed to the upstream portion 16 of wall 7. The downstream portion 18 of the wall extends from ring 12 to an outlet 19 for combustion products. An external flange 20 on the downstream end of the wall section 18 blocks or controls flow of air from the space 22 within the casing 3 past the end of the liner. This ring may support the downstream end of the liner in proper relation to the casing 3.

The upstream end of the liner is located and supported by a generally cylindrical fitting 23 which extends through a mating opening 24 in the end wall of casing 3. Fitting 23 is connected to the end wall 6 by any suitable means. As illustrated, the connection involves four L-shaped brackets 26 equally spaced around the axis of the liner and welded or brazed to the fitting 23 and wall 6.

Head wall 6 has a frustoconical central section 27 from the center of which a nozzle, spout, or jet 28 extends axially downstream into the liner. Six contiguous nozzles 30 are disposed in a ring around the nozzle 28. Nozzles 30 are directed downstream and slightly outward (at an angle of about 22° to the liner axis in the particular embodiment). It will be seen that these nozzles have a converging air entrance portion and a cylindrical discharge portion so that they tend to discharge the air in a coherent jet directed along the axis of the nozzle under the effect of the pressure drop from the outside to the inside of the liner.

Six upstream directed nozzles 32 spaced 60° apart around the axis of the liner extend upstream into the liner from the frustoconical ring 15. These nozzles are of a converging configuration similar to the nozzles 30 and each nozzle 32 is coaxial with a nozzle 30. Therefore, the streams of air entering each set of nozzles 30, 32 impinge directly head-on.

Figure 2:
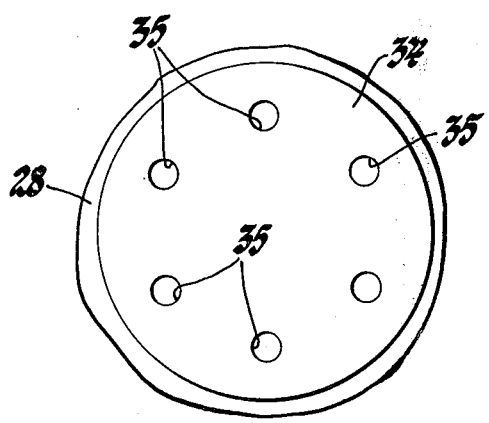
FIG. 2 is a detail cross-sectional view taken on the line 2—2 in FIG. 1.

The nozzles 32 are simply short converging tubes, as illustrated. The nozzle 28 is of similar configuration except that its discharge end is partly closed by a perforated disk 34 (see also FIG. 2). This disk has a ring of six small perforations or holes 35 for the purpose of providing some additional combustion air to the center of the reaction zone and to increase turbulence in that area.

Figure 3:
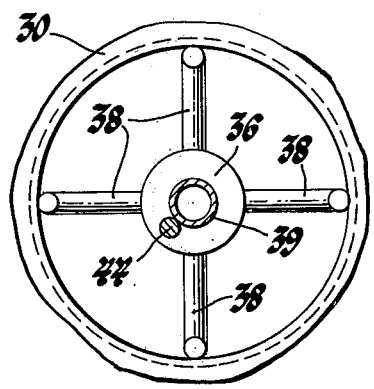
FIG. 3 is a detail cross-sectional view taken on the line 3—3 in FIG. 1.

Each air nozzle 30 includes means for atomizing fuel. A small splash plate 36 (see also FIG. 3) which may have about 1/10 the area of the nozzle outlet is supported near the outlet of each nozzle 30 by a wire spider 38 which may be brazed or welded to the interior of the nozzle 30.

Fuel is discharged against each splash plate from a fuel tube 39 extending toward it from the fitting 23. This fitting has a central bore 40 for liquid hydrocarbon fuel which is supplied through a tube 42 from a suitable source of fuel under pressure as is customary in gas turbine combustion apparatus. Six branch passages 43 connect the bore 40 with the tubes 39, the ends of which are inserted into recesses in the end of fitting 23. These tubes may be brazed in place. The downstream ends of tubes 39 are located and connected to the splash plates by wire struts 44 which may be brazed or welded to the tubes and to the splash plates. When the fuel strikes the splash plates with considerable velocity it spatters sideways and is picked up by the air flowing through the annular opening around the splash plate 36 and carried with the jet of air into the combustion zone where it hits head-on the jet of air coming in from the opposed nozzle 32. The result is a very complete mixing of fuel and air, a great deal of turbulence, and complete combustion. A suitable means for igniting the combustor such as an electrical spark igniter (not illustrated) may be provided.

The upstream portion 16 of the side wall is film-cooled by air which enters the liner through a ring of holes 46 and is directed downstream of the liner by a deflector ring 47 welded or otherwise fixed to the liner. In the particular example there are forty of these holes and they are about 3/10 millimeter in diameter. The particular liner illustrated is about 15 centimeters in diameter.

The combustion products resulting from the reaction in the zone 8 flow through the restricted passage 11 into the dilution zone 10. Here additional air is supplied and mixed with the combustion products to bring the resulting mixture down to a temperature suitable for operation of the turbine. As illustrated, there are 12 dilution air ports 48 each approximately 12.5 millimeters in diameter. The wall 18 of the reaction zone is film-cooled by air admitted through a ring of holes 50 and directed along the liner wall by a deflector ring 51. Turbulent mixing in the dilution zone serves to provide a uniform mixture of the hot combustion products and dilution air and a good temperature profile at the outlet 19 of the burner.

It will be apparent from the foregoing that our combustion apparatus provides for highly turbulent burning conditions and provides a simple and highly suitable means for atomizing and mixing the fuel with the combustion air.

It may be noted that, while the combustion liner shown is of circular cross section, the principles of the invention are equally applicable to the well known annular type of combustion apparatus in which there is an outer side wall, an inner side wall, and an annular head wall. In such case the nozzles 28 and 30 would project into the liner from the head wall and half of the nozzles 32 would project in from the outer side wall and the other half from the inner side wall. The constricted passage 11 would be defined between two rings, one extending inwardly from the outer wall and one extending outwardly from the inner wall.

The detailed description of the preferred embodiment of the invention for the purpose of explaining the principles thereof is not to be considered as limiting or restricting the invention, since many modifications may be made by the exercise of skill in the art.

We claim:

1. A combustion liner comprising a head wall; side wall means extending downstream from the head wall to a combustion products outlet, the head wall and the upstream portion of the side wall means bounding a reaction zone, and the downstream portion of the side wall means bounding a dilution zone; and a plurality of pairs of nozzles providing air entrances into the reaction zone, the nozzles of each pair being substantially coaxial and oppositely directed, each pair comprising a first nozzle extending downstream from the head wall, and a second nozzle extending upstream from the side wall means, the first nozzle having an outlet farther from the adjacent portion of the side wall means that is the outlet of the second nozzle; and means for mixing fuel into the air flowing through one nozzle of each pair.

2. A combustion liner comprising a head wall; side wall means extending downstream from the head wall to a combustion products outlet, the head wall and the upstream portion of the side wall means bounding a reaction zone, and the downstream portion of the side wall means bounding a dilution zone; barrier means extending inwardly from the side wall means between the reaction and dilution zones providing a constricted path between the zones; a plurality of pairs of nozzles providing air entrances into the reaction zone, the nozzles of each pair being substantially coaxial and oppositely directed, each pair comprising a first nozzle extending downstream from the head wall and a second nozzle extending upstream from the side wall means upstream of the barrier means, the first nozzle having an outlet farther from the adjacent portion of the side wall means than is the outlet of the second nozzle; and means for mixing fuel into the air flowing through one nozzle of each pair.

3. A combustion liner comprising a head wall; side wall means extending downstream from the head wall to a combustion products outlet, the head wall and the upstream portion of the side wall means bounding a reaction zone, and the downstream portion of the side wall means bounding a dilution zone; a plurality of pairs of nozzles providing air entrances into the reaction zone, the nozzles of each pair being substantially coaxial and oppositely directed, each pair comprising a first nozzle extending downstream from the head wall and a second nozzle extending upstream from the side wall means, the first nozzle having an outlet farther from the adjacent portion of the side wall means than is the outlet of the second nozzle; and means for mixing fuel into the air flowing through the first nozzles comprising a fuel tube extending substantially along the axis of the nozzle and a splash plate located so as to be impinged by fuel discharged from the fuel tube.

4. A combustion liner comprising a head wall; side wall means extending downstream from the head wall to a combustion products outlet, the head wall and the upstream portion of the side wall means bounding a reaction zone, and the downstream portion of the side wall means bounding a dilution zone; barrier means extending inwardly from the side wall means between the reaction and dilution zones providing a constricted path between the zones; a plurality of pairs of nozzles providing air entrances into the reaction zone, the nozzles of each pair being substantially coaxial and oppositely directed, each pair comprising a first nozzle extending downstream from the head wall and a second nozzle extending upstream from the side wall means upstream of the barrier means, the first nozzle having an outlet farther from the adjacent portion of the side wall means than is the outlet of the second nozzle; means for mixing fuel into the air flowing through at least some of the said nozzles; and further nozzle means for directing air from the head wall toward the center of the reaction zone.

5. A combustion liner comprising a head wall; side wall means extending downstream from the head wall to a combustion products outlet, the head wall and the upstream portion of the side wall means bounding a reaction zone, and the downstream portion of the side wall means bounding a dilution zone; barrier means extending inwardly from the side wall means between the reaction and dilution zones providing a constricted path between the zones; a plurality of pairs of nozzles providing air entrances into the reaction zone, the nozzles of each pair being substantially coaxial and oppositely directed, each pair comprising a first nozzle extending downstream from the head wall and a second nozzle extending upstream from the side wall means upstream of the barrier means, the first nozzle having an outlet farther from the adjacent portion of the side wall means than is the outlet of the second nozzle; means for mixing fuel into the air flowing through the first nozzles comprising a fuel tube extending substantially along the axis of the nozzle and a splash plate located so as to be impinged by fuel discharged from the fuel tube; and further nozzle means for directing air from the head wall toward the center of the reaction zone.

* * * * *